United States Patent [19]

Hopkins

[11] Patent Number: 4,996,593
[45] Date of Patent: Feb. 26, 1991

[54] A METHOD OF AND APPARATUS FOR COMPARING THE LOCATION OF AN EXTENDED FEATURE WITHIN A FIELD OF VIEW WITH A STANDARD LOCATION

[75] Inventor: Brian M. Hopkins, Ennis, Ireland

[73] Assignee: Westinghouse Electric Corp., Pittsburgh, Pa.

[21] Appl. No.: 444,655

[22] Filed: Dec. 1, 1989

[30] Foreign Application Priority Data

Dec. 1, 1988 [IE] Ireland .................................. 3601/88

[51] Int. Cl.⁵ .............................................. H04N 7/18
[52] U.S. Cl. .................................... 358/101; 358/107; 382/22; 382/8
[58] Field of Search ................ 358/107, 101, 106, 96; 382/19, 22, 8, 48

[56] References Cited

U.S. PATENT DOCUMENTS 4,242,662 12/1980 Tsujiyama et al. ............... 382/22 X
4,479,145 10/1984 Azuma et al. ..................... 382/8 X
4,908,871 3/1990 Hara et al. ............................ 382/8

Primary Examiner—Victor R. Kostak

[57] ABSTRACT

Method of, and apparatus for, comparing the location of an extended feature within a field of view with a standard location. The field of view is scanned to obtain a binary video signal representing the feature, the signal is processed to give a single feature position pulse when scanning of the feature has been completed, the scan co-ordinates of the feature position pulse are determined, and the co-ordinates are compared with those corresponding to the standard location. The area of the feature may also be determined. The method is applicable to the checking of printed circuit boards.

9 Claims, 5 Drawing Sheets

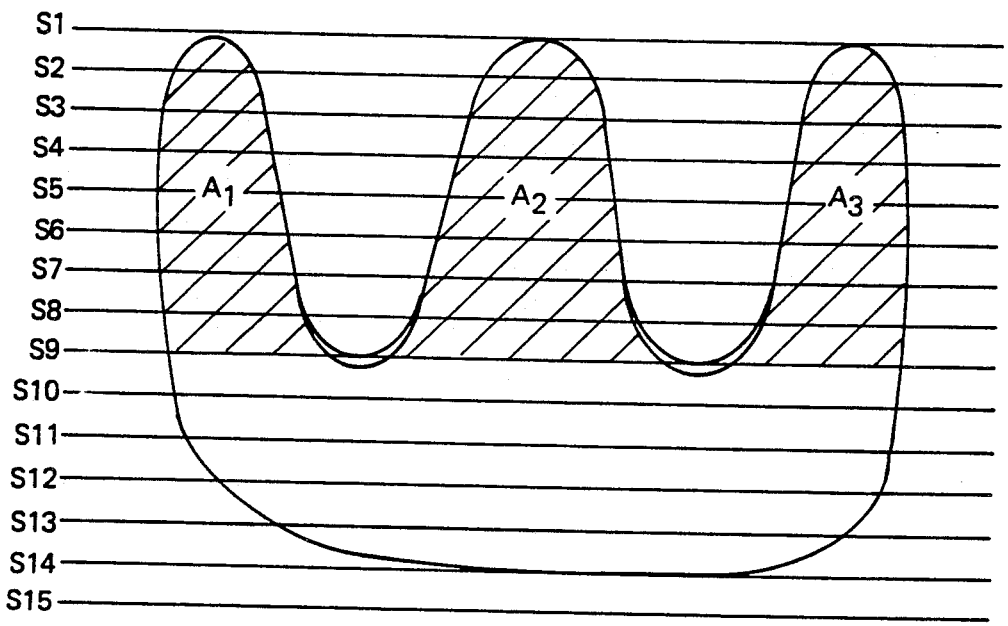
FIG.6
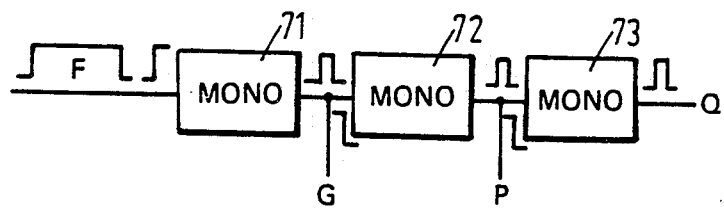
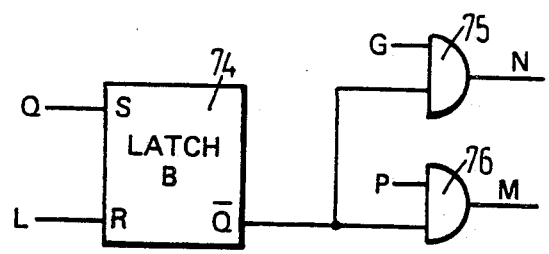
FIG.7

A METHOD OF AND APPARATUS FOR COMPARING THE LOCATION OF AN EXTENDED FEATURE WITHIN A FIELD OF VIEW WITH A STANDARD LOCATION

RELATED APPLICATIONS

U.S. patent application Nos. 340,989 filed on Apr. 20, 1989 and 385,749 filed on July 26, 1989.

BACKGROUND OF THE INVENTION

The invention provides a method and apparatus for determining the location, and preferably also the area, of a particular feature within a field of view. In one application of the invention it may be required to determine, for example, whether a component such as a memory chip is correctly located on a printed circuit board.

SUMMARY OF THE INVENTION

In the invention, which is defined in the appended claims, the field of view is scanned to obtain a video signal representing the feature, and this signal is processed to obtain the co-ordinates of a unique point representing the position of the feature, and preferably also to obtain a measure of the feature area. The position and area so determined may be compared with those for an ideal case, for example if the object being scanned is a printed circuit board, the data may be compared with similar data obtained by scanning a board which has been checked and is known to be accurate, or with data for an ideal board which have been determined and stored in memory.

BRIEF DESCRIPTION OF THE DRAWINGS

The invention will be described in more detail with reference to the accompanying drawings, in which

FIG. 6 illustrates the operation of the invention with a feature of vertically re-entrant shape, and FIG. 7 shows various circuits used in carrying out the invention.

DESCRIPTION OF THE PREFERRED EMBODIMENT

Figure 1:
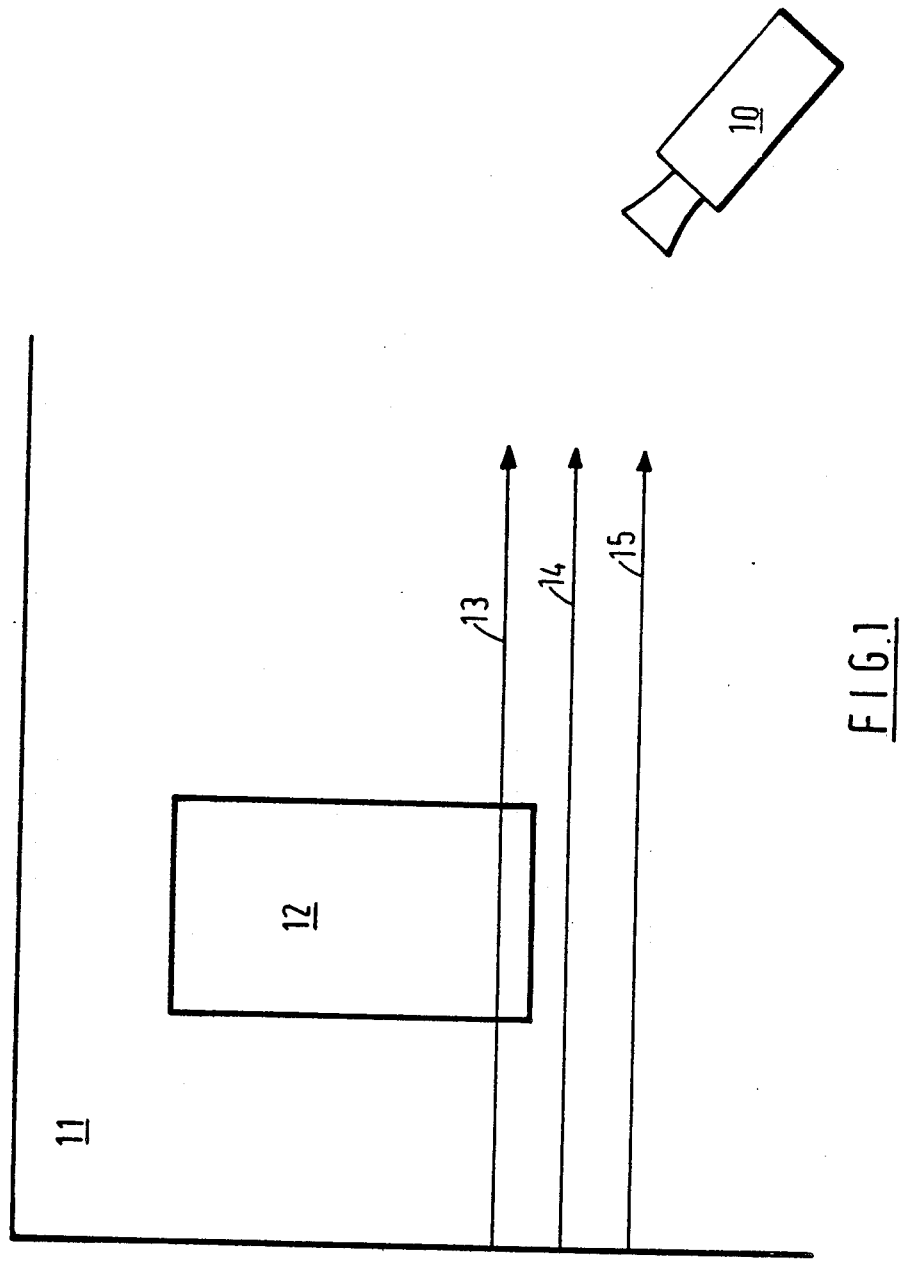
FIG. 1 is a schematic diagram illustrating the scanning process of the invention.
Figure 3:
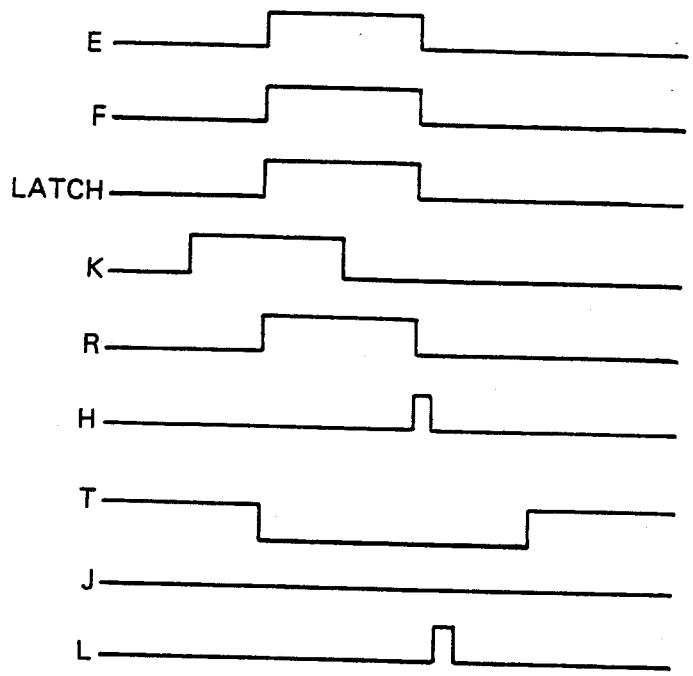
FIGS. 3 and 4 are waveforms related to the circuit of FIG. 1

Referring first to FIG. 1, a video camera 10 is arranged to scan a field of view 11 containing a feature 12 of rectangular outline. In a practical case the field of view may be occupied by a printed circuit board, and the feature may be an integrated circuit chip mounted on the board, and whose position is to be checked. The last scan intersecting the feature and the next two succeeding scans are shown at 13, 14 and 15 respectively, with their spacings very much exaggerated for purposes of explanation. The grey scale of the video system is adjusted and the video signal is processed so that the output signal is a binary signal having the value "0" for the background and the value "1" where the scan crosses the feature. One circuit suitable for this purpose is described in our pending U.S. patent application Ser. No. 340,989 filed Apr. 20, 1989. Referring for a moment to FIG. 3, the output signal for the scan 13 of FIG. 1 is represented by waveform E. The video signals so obtained are processed so as to obtain, for each feature, the co-ordinates of a uniquely defined point characterising the position of the feature, and preferably also a measure of the area of each feature.

Figure 2:
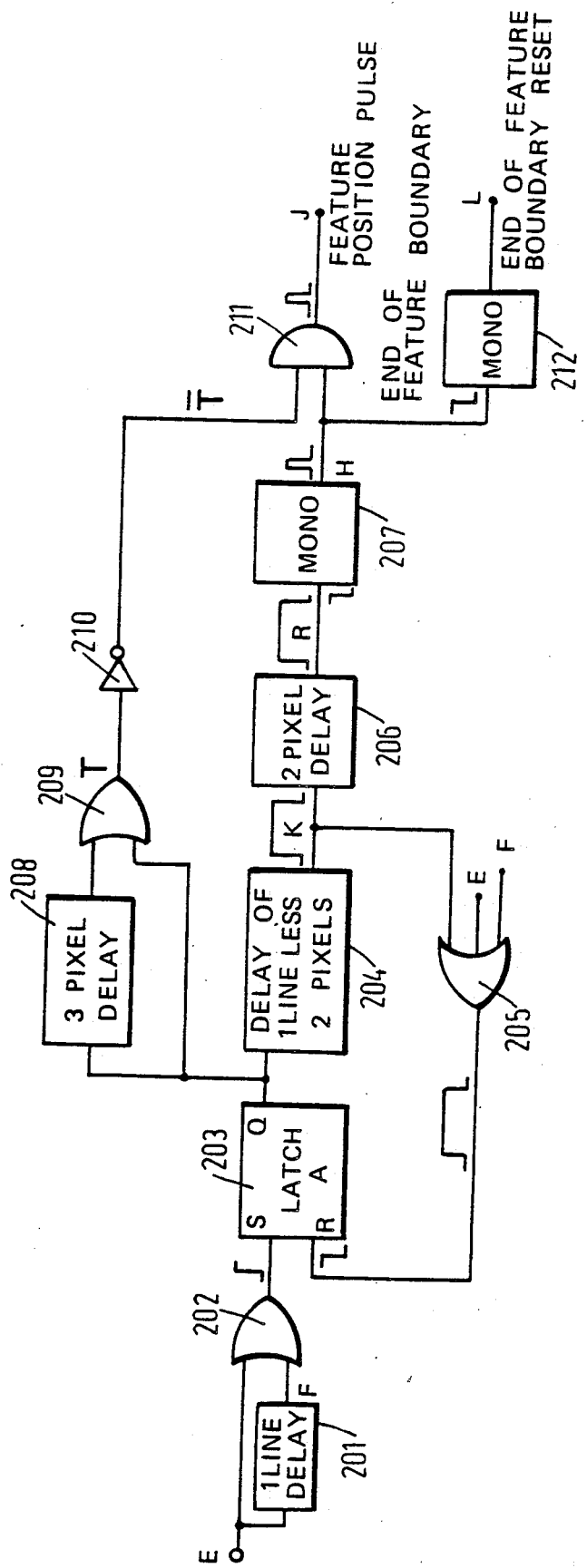
FIG. 2 is a logic diagram showing how the feature position pulse is generated.

The circuit of FIG. 2 generates a feature position pulse at such a characteristic point. The scan signal E is delayed in a delay line 201 by a time equal to one scan interval to give a delayed signal F, and both the original signal E and the delayed signal F are combined by an OR gate 202 and applied to a latch 203, which is set by the leading edge of the signal. The output of the latch 203 is delayed by two pixels less than one scan line by the delay line 204 to give a signal K and this is combined in an OR gate 205 to provide a signal whose trailing edge resets the latch 203.

The signal K is further delayed by two pixels by the delay line 206 to give a signal R, which corresponds exactly with the scan signal E, but is delayed by one scan line, or, in the case of the final scan of a feature, when the latch 203 is set by the delayed signal F, by two scan lines. This signal is applied to a monostable or trigger 207 which responds to its trailing edge to generate a pulse H of 0.5 pixel in length.

A gating signal is generated from the output of the latch 203 by delaying the signal by three pixels by means of a delay 208 and ORing the latch output with the delayed signal in an OR gate 209 to give a signal T which is stretched by three pixels. This is inverted by an inverting amplifier 210 and applied as one input of an AND gate 211, the other input of which receives the signal pulse H. The output of this AND gate provides the feature position pulse J, as will be explained below.

Figure 4:
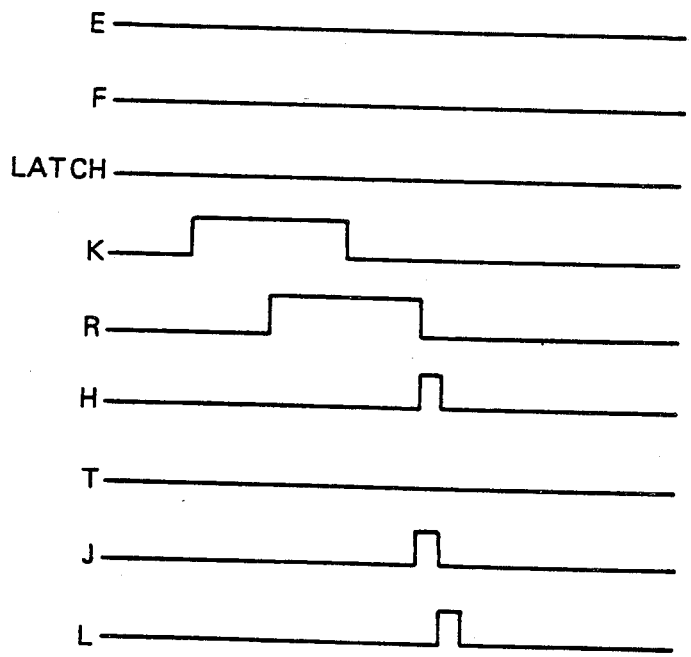

The pulse H is also applied to a trigger or monostable 212 which responds to its trailing edge by generating a further pulse signal L. As will be clear from study of the circuit, the signal L must occur later than the trailing edge of the feature on each scan by at least the width of the pulse H, and this signal is made use of in the area measuring circuits to be described below. The operation of this circuit will now be described with reference to the scan lines of FIG. 1 and the waveforms of FIGS. 3 and 4.

On the scan 13 the signal E of FIG. 3 is generated, and, in the case of a feature of the form shown in FIG. 1, a substantially identical signal F results from the delay of the previous scan by the delay line 201. These signals set the latch 203, and it is reset by their trailing edges through the OR gate 205, the other input, K, to this gate having terminated two pixels earlier.

The latch signal is delayed by a delay of two pixels less than one scan to give the signal K, and the introduction of an additional two pixel delay on the K signal will create the signal R which is in horizontal synchronisation with the feature but delayed by exactly one line. The trailing edge of R, which, in the case of a feature of the shape shown in FIG. 1 will correspond to its further boundary, generates a pulse H at the monostable 207.

The output of the latch 203 is stretched by the delay 208 and OR gate 209 to give the signal T, which is inverted and gates the pulse H. Since T terminates after H, the pulse H is blocked, and there is no output from the AND gate 211.

On the next scan, 14 (FIG. 1), there is no signal E, but the delayed signal F sets the latch 203 as before, and the remaining waveforms are as shown in FIG. 3.

On the next following scan, 15, neither E nor F is present, and the latch 203 is not set. However the signal K, representing the delayed latch output from the previous scan is still present, and the pulse H is again generated. On this scan there is no input to the pulse stretching circuit, and the signal T is not generated. The AND gate 211 therefore passes an output J, two scan lines beyond the lower edge of the feature and, in the case of a feature of the shape shown, in line with its further edge. The co-ordinates of this pulse, which can readily be determined by counting line pulses from the frame trigger and pixel clock pulses from the line flyback, can be taken as identifying the position of the feature in the field of view, and may be compared with the corresponding co-ordinates for an ideally positioned feature, either measured similarly on an ideal specimen, or stored in a data store.

The circuit thus provides signals which;
(i) Define an exact region encompassing each feature (R)
(ii) Remove any lower edge re-entrant effects
(iii) Define the rear edge of each feature boundary (H)
(iv) Define an exact singular point following the end of each feature (J)

Figure 5:
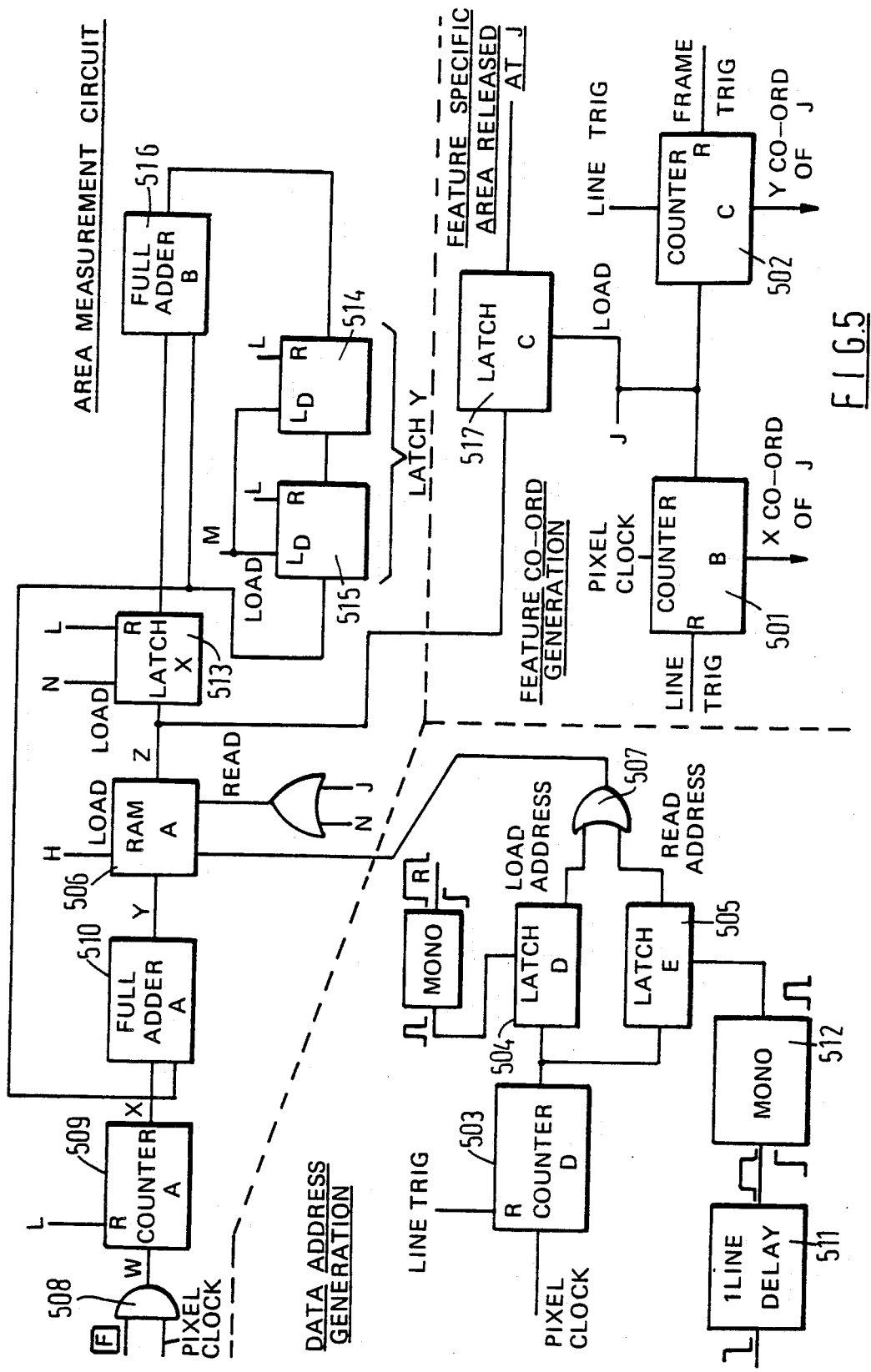
FIG. 5 shows counting and adding circuits used in the invention.

FIG. 5 shows, inter alia, the circuit for determining the co-ordinates of the feature position pulse J. It comprises two counters, of which the counter 501 counts pixel clock pulses and is reset at each scan by the line trigger, and the counter 502 counts line trigger pulses and is reset at each frame by the frame trigger. The pulse J is applied to these counters and causes their contents to be read into memory, so providing co-ordinate values for the point defined by the pulse.

In the preferred form of the invention the area as well as the position of each feature is recorded so that it can be compared with a standard. If, for example, the system is used for checking a printed circuit board during manufacture, a check of the feature area provides at least a partial safeguard against the wrong chip being inserted in any particular position.

Referring back to FIG. 1, it will be recalled that the latch 203 is set by the leading edge of the OR'ed function of E and F. Therefore whichever of the real line signal E or the 1-line delayed signal F occurs first will cause the latch to set. This latch is re-set by the trailing edge of the OR'ed function produced by E, F and the output of the latch delayed by 2 pixels less than one line. The effect of this is to set and re-set the latch at points defined by E or F while within a feature without a re-entrant boundary. Both the actual line signal E and the delayed line signal F are used to ensure that the latch and the delayed latch signal K start and finish correctly at the first and last line of a feature. In fact, it takes one line for the circuit to generate correctly due to the delay of one line less two pixels, and this is the reason for the use of the delayed signal F for area measurement, as will be explained below.

The area of a single feature can be easily determined by accumulating pixel clock pulses for the duration of each scan across the feature. However, a single scan line will generally cross two or more features, and the areas of these features must be accumulated separately and identified with the feature when they are read out. This is achieved in the present invention by progressively recording the accumulated pulses for each feature in a random access memory at an address corresponding to the leading edge of the feature signal on that scan.

The circuit for generating this address is shown on the left-hand side of FIG. 5. In this circuit all addresses are generated from the leading edge of the signal R (see FIG. 2).

A counter 503 counts pixel clock pulses during each line, starting at the end of the line trigger signal. The output of this counter is applied to two latches, 504 and 505. Latch 504 is triggered to load the horizontal scan location at a position defined by the leading edge of the signal R. Latch 505 is triggered to load the horizontal scan location at a position defined by the leading edge of the signal produced by delaying R by one line. The output of latch 504, which is in reality a multi-bit binary word (9 bits for a 512 pixel/line system) is the load address at which the accumulated count for the feature area will be loaded into the RAM at each scan, while the output of latch 505 is the read address from which it will be read on the next scan. These addresses are supplied alternately to the RAM 506 in which the area of the feature is to be accumulated through a multiplexer, represented in the Figure by the OR gate 507.

The F signal gates the pixel clock signal through an AND gate 508 to produce a signal W which is a stream of clock pulses indicating the presence of a feature. These pulses are accumulated in a counter 509 so that at the end of each line of the feature a number representing the length of that line within the feature is obtained. The signal X from the counter at the end of each feature represents this length. The counter is reset by the L pulse which is generated at the end of the feature boundary as described previously.

The signal X is fed to one input of the full adder 510, in which it is added to a signal representing the area so far accumulated for the feature. To do this the output of full adder 510, which is shown as signal Y, is fed into RAM 506 at the load address held in latch 505, which represents the location of the leading edge of the feature boundary. Obviously this will have become available before the back edge is reached, and so before the signal H triggers the loading of the signal Y into the RAM.

When the signal is read out on the next scan for the next count to be added, the read address is taken from the latch 505. This is latched by the leading edge of the signal R delayed by one line interval in the delay line 511, the edge being detected by the monostable 512, and so the read address is identical with the address at which the signal was stored.

The signal so read out must be added to the contents of the counter 509 and again stored in the RAM 506 in order to accumulate the total area of the feature. Since a scan line may cover more than one feature, it is necessary to ensure that the data read out relate to the particular feature which is currently being scanned. The address from which this data is read, as explained above, is obtained simply by delaying the feature R by one complete line and then reproducing the same address as was used for loading but this time putting the information into latch 505. The address is then multiplexed in and fed to the RAM. The information is read at this address from RAM 506 under the control of a timing signal N, while within the main boundary of the feature. The signal N is derived from the leading edge of the F signal, as will be explained below with reference to FIG. 7, and therefore information is read from the RAM for the previously accumulated area of a feature at the start of the line which is currently to be measured. The address from which that information is read, being derived from the R signal delayed by one complete line, is obviously the same address as was used to read the data in from the previous line for this feature. Therefore as the scan progresses down the feature the data is first loaded into, and then read out from, the same address. However it should be noted that as the scan moves down the feature the actual address will vary and follow the front edge of the feature. Therefore the signal that is obtained at Z is the area of any feature for all lines prior to the current line and is read out at the start of the current line.

The signal Z read from the RAM 506 passes into a latch 513 also loaded from the N signal. During the period of N, while the information is read from RAM 506, latch 513 is effectively transparent and will automatically be loaded with the area information of Z.

From latch 513 the signal is applied to one input of a full adder 516. Immediately following the N signal comes a further timing signal M, also derived from the leading edge of the signal F, as will be explained with reference to FIG. 7. This M signal is used to feed the two halves, 514, 515 of a latch Y which follows the output of the full adder 516. The signal obtained at latch 513, which is the Z signal, is fed to one input of this adder, while the other input is the signal output of latch Y.

At the starting edge of any feature, latch Y is reading zero. Since the output of latch 513 is the Z signal already transferred on N, this information is directly passed to the output of the full adder 516. Immediately following N, the leading edge of the M pulse will load the output of the full adder 516 into the first half of latch Y. On the rear edge of the M signal this information from the front half of latch Y is fed to the second half of latch Y. The effect of this overall circuit therefore is to automatically feed the Z signal through latch 513 and add it round to any pre-set number held in latch Y. For simple features, i.e. those not having a re-entrant outline, it means that immediately following the M signal we have held on the output of latch Y the previous value of the area for the accumulated feature down to the current line. Since the output of latch Y is fed directly back to the input to full adder 510 it means that, at the end of the current line, the current line value X will be automatically added to the existing value for the feature down to the current line and produce the correct summation at Y. In this way the loop will continuously feed data round adding it successively to the current value of the line and loading it into a known location within RAM 506.

This successive addition will continue until such time as the feature position pulse J occurs. When this occurs there will be no M or N pulse, but there will have been an R signal on the previous line which will give a read address in latch 505. The J pulse is applied through an OR gate 517 to the RAM 506 to cause the accumulated value for the area of the feature to be read from RAM 506. The J signal also causes this area information Z to be loaded into a further latch 517 which is also operating under command of the J signal. In this way non-re-entrant features will have their areas automatically defined and released at the feature position pulse J.

The latch Y, comprising the two half-latches 514 and 515, and the adder 516 do not modify the signal passing through them in the case of a simple rectangular feature such as discussed above. However, they are required to enable the areas of vertically re-entrant features to be computed correctly.

A feature of this kind is shown in FIG. 6. As shown in the figure, it has three vertically-pointing limbs all joining the body of the main feature on the same scan line (shown as S9 on the diagram). Prior to line S9 the accumulation of the area data for the three limbs, shown as A1, A2 and A3, will be as outlined earlier. Therefore, as far as scan line S9, the system will treat the feature as if it comprised three separate features.

Now consider the sequence of events from scan line S10 onwards. The line area data for the line S10 will be accumulated as normal and placed in counter 509 as the signal X at the end of the scan line. Also at the start of S10 the location address for the feature will have been correctly defined as the commencement of line S10 by the feature boundary signal. However the read address will in turn be derived from the delayed signal of line S9. The effect of this, as one progresses across the scan line S10, will be that the area A1 will be read from the RAM at the start of the first limb by the signal N at an address derived by the one-line-delayed R signal. As indicated earlier this area will be fed round the full adder and latch Y loop until it is sitting at the output of the second half of latch Y. This data will not yet be read into RAM 506, since data will only be fed in at the occurrence of the H pulse at the end of scan line S10. Therefore at the end of A1 limb the area A1 will be sitting on the output of latch Y.

At the point corresponding to the start of the second limb of the feature (A2) as detected by the delayed S9 signal a new read address will be held in latch 505, relating to the commencement of the A2 limb at an address defined on the S9 line. Now however at the start of the A2 signal when the N pulse occurs again, the data for the A2 limb will be read directly from RAM 506 and it will be loaded into latch 513. Full adder 516 will add the existing value on latch Y, namely area A1, to the value of latch 513, namely area A2, and will load this to latch Y under command of the M pulse. Therefore at the end of the A2 limb on line S10 the latch Y will have sitting within it the summation of the A1 and A2 limbs. Similarly when the third limb A3 is encountered this will be added to the output of latch Y in the same way, except again that latch Y will now have on it the value of A1+A2. Therefore at the end of line S10 the signal which is fed into full adder 510 from latch Y will actually be the value of A1+A2+A3. Therefore the signal obtained at Y will be the summation of the value of the area of line S10 plus the summed value of the vertical pointing limbs A1, A2 and A3. This continuous summation loop is capable of handling any number of vertical pointing limbs and releasing the data at the correct address defined by the start of the current line and read in by a signal derived by the end of the current line. Scanning will continue as for a non-re-entrant feature until the J pulse, when the total area value for the feature will be released and fed into latch 517.

To ensure that the M and N signals are not generated during a downward pointing re-entrant feature, these signals are generated by the circuits shown in FIG. 7. Referring to this figure, a first monostable, 71, generates the signal G at the leading edge of F. Further monostables, 72 and 73, operating on the trailing edges of their inputs, produce successive pulses P and Q. A latch 74 is set by Q, i.e. shortly after the leading edge of F, and is reset by the end-of-feature-boundary pulse L (FIG. 2). The P and Q pulses AND gated with the reset output of latch 74 by AND gates 75 and 76 to give the the M and N signals. When the limit of the re-entrant boundary of a feature such as that of FIG. 6 has been reached, the next scan misses the boundary, and no L pulse is generated. The latch 74 is thus not reset, and the AND gates 75 and 76 are not enabled, so the signals M and N are not generated. Therefore for downward- pointing re-entrant features the addition system will not react to the edges of the limbs except at the back edge of the last limb (i.e. as if it were a solid non re-entrant-feature). Note however that the actual measured data will be correct, since it is generated from F.

For certain applications it may be advantageous to compute feature specific data within individual boundary regions. As an example of this one can consider surface mount devices, where what is of importance is the individual location of a specific leg of a discrete device, or an electrode on a passive device, should lie within a region defined by the pad upon which the leg of that device should be positioned. The present invention may be used to determine this.

For this purpose, data corresponding to the positions of, for example, connection pads on a printed circuit board, are held in a gating store. Referring back to FIG. 5, the F signal used to gate the pixel clock through the AND gate 508 to provide the input to the counter 509 is derived by delaying the video signal E by one line scan. In this application of the invention the E signal input to the AND gate 508 is replaced by the signal stored in this gating store. The feature boundary and data control circuits still operate on the video signal derived by scanning the electrode or pin of the device, but the counting of pixel clock pulses and the computation of area only takes place within the region defined by the gating store, namely the pad location. The stored area thus provides a measure of the overlap between the electrode or pin and its connection pad. A related system is described in our pending Irish patent application No. 2350/88.

I claim:

1. A method of comparing the location of an extended feature within a field of view with a standard location, comprising scanning the field of view to obtain a binary video signal representing the feature, processing the feature signal so obtained, including delaying it by an integral number of line scan intervals and deriving from the delayed signal an end-of-feature-boundary pulse, gating the end-of-feature-boundary pulse with a stretched inverted feature signal, thereby producing a single feature position pulse when scanning of the feature has been completed, determining the scan co-ordinates of the feature position pulse, and comparing the co-ordinates with those corresponding to the standard location.

2. A method according to claim 1 including providing a line trigger pulse at the beginning of each line scan, determining the co-ordinates of the feature position pulse by counting line trigger pulses from the beginning of a frame scan to the feature position pulse and by counting pixels from the line trigger pulse to the feature position pulse.

3. A method according to claim 1, further including determining the area of the feature by counting pixel clock pulses throughout the duration of the feature signal on each line scan until scanning of the feature has been completed, and comparing the area so determined with a standard area.

4. A method according to claim 3 in which the pixel clock pulses are gated by a gating signal whereby the area determined is the overlap area between the feature and reference areas defined by the gating signal.

5. A method according to claim 1 in which the field of view contains a printed circuit board and at least one feature is a component mounted on the board.

6. A method according to claim 4 in which the field of view contains a printed circuit board, at least one feature is a component mounted on the board by means of connection pins or terminals, and the gating signal defines connection areas at which the pins or terminals are to be connected.

7. Apparatus for carrying out the method of claim 1 comprising video scanning means arranged to scan a field of view and produce binary signals defining features within the field, a signal- processing circuit operating on the actual and delayed feature- defining signals to produce an end-of-feature-boundary pulse on each scan, means for gating the end-of-feature-boundary pulse with a stretched delayed feature signal to produce a feature position pulse at a definite point following completion of the scan of a feature, and line and pixel counters arranged to count scan lines from the start of the scan frame to the feature position pulse and to count pixels from the line trigger to the feature position pulse so as to obtain the co-ordinates of the feature position pulse.

8. Apparatus according to claim 7 further including means for counting and for accumulating the count of pixel pulses during the feature signal and releasing the total count on occurrence of the feature position pulse, thereby obtaining the total area of the feature.

9. Apparatus according to claim 8 in which the means for accumulating the pixel count comprises a random-access memory, means for writing the accumulated count into the memory at an address related to the leading edge of the feature signal, means for subsequently reading the accumulated count from the address at which it was written, an adder for adding to the accumulated count, before it is again stored, the count of the current scan line, and means for reading out the contents of the memory on the occurrence of the feature position pulse.

* * * * *